(12) United States Patent
Rose et al.

(10) Patent No.: US 7,903,586 B2
(45) Date of Patent: Mar. 8, 2011

(54) RING RAPID MULTIPLE SPANNING TREE PROTOCOL SYSTEM AND METHOD

(75) Inventors: Laurence Rose, Oak Park, CA (US); Roberto Henrique Jacob da Silva, Oak Park, CA (US)

(73) Assignee: Alcatel Lucent, Paris (FR)

( * ) Notice: Subject to any disclaimer, the term of this patent is extended or adjusted under 35 U.S.C. 154(b) by 482 days.

(21) Appl. No.: 11/861,902

(22) Filed: Sep. 26, 2007

(65) Prior Publication Data

US 2008/0101219 A1 May 1, 2008

Related U.S. Application Data

(60) Provisional application No. 60/863,851, filed on Nov. 1, 2006.

(51) Int. Cl.
*H04L 12/28* (2006.01)

(52) U.S. Cl. ......... 370/256; 370/222; 370/223; 370/224; 370/255; 370/258

(58) Field of Classification Search .......... 370/222–224, 370/255, 256, 258
See application file for complete search history.

(56) References Cited

U.S. PATENT DOCUMENTS

| | | | |
|---|---|---|---|
| 6,826,158 B2 * | 11/2004 | Seaman et al. | 370/254 |
| 6,891,808 B2 * | 5/2005 | Ishii | 370/256 |
| 7,003,705 B1 | 2/2006 | Yip et al. | |
| 7,339,888 B2 * | 3/2008 | Higashiyama et al. | 370/223 |
| 7,480,258 B1 * | 1/2009 | Shuen et al. | 370/256 |
| 2004/0081083 A1 | 4/2004 | Sekihata | |
| 2006/0245351 A1 * | 11/2006 | Pande et al. | 370/216 |
| 2007/0008964 A1 | 1/2007 | Rose et al. | |
| 2007/0025275 A1 * | 2/2007 | Tallet et al. | 370/255 |
| 2007/0165517 A1 * | 7/2007 | Binetti et al. | 370/222 |

FOREIGN PATENT DOCUMENTS

EP 1672847 A1 6/2006

OTHER PUBLICATIONS

"Virtual Bridged Local Area Networks"; IEEE Standard for Local and metropolitan area networks; IEEE Computer Society; May 19, 2006; 303 pages.
Casale S et al. International Federation for Information Processing: "A Multiple Spanning Tree Protocol in Bridged LANS" Information Processing, San Francisco, Aug. 28-Sep. 1, 1989, Proceedings of the IFIP World Computer Congress, Amsterdam, North Holland, NL, vol. Congress 11, Aug. 28, 1989, pp. 633-638, XP000079115.
PCT Search Report for PCT Patent Application No. PCT/US2007/083320 dated Apr. 2, 2008.

* cited by examiner

*Primary Examiner* — William Trost, IV
*Assistant Examiner* — Toan D Nguyen
(74) *Attorney, Agent, or Firm* — Capital Patent & Trademark Law Firm, PLLC

(57) ABSTRACT

In an embodiment, a method is disclosed for operating a network having a group of bridges connected together to form a ring, each bridge having two ports assigned to the ring to form a group of ring ports. The claimed embodiment includes forwarding information through the ring according to one or more spanning tree instances, each instance designating one of the group of ring ports as a respective alternate port that is in a state of discarding. Responsive to learning of a failure by a bridge within the ring, a determination is made, for each spanning tree instance, whether the bridge contains a respective alternate port and if the bridge contains a respective alternate port, changing the state of the respective alternate port to forwarding.

7 Claims, 9 Drawing Sheets

RING RAPID MULTIPLE SPANNING TREE PROTOCOL SYSTEM AND METHOD

PRIORITY UNDER 35 U.S.C. §119(e) & 37 C.F.R. §1.78

This nonprovisional application claims priority based upon the following prior United States provisional patent application: "RING RAPID SPANNING TREE (RRSTP) FOR MULTIPLE SPANNING TREE PROTOCOL (MSTP)," Application No. 60/863,851, filed Nov. 1, 2006, in the name(s) of: Laurence Rose and Roberto Henrique Jacob da Silva, which is hereby incorporated by reference.

FIELD

The present patent disclosure generally relates to network protocols. More particularly, and not by way of any limitation, the present patent disclosure is directed to a system and method for incorporating the use of a ring protocol with Multiple Spanning Tree Protocol.

BACKGROUND

Spanning tree protocols are well-known in the art for providing path redundancy within a network while preventing undesirable loops. Examples of conventional spanning tree protocols include, but may not be limited to, Spanning Tree Protocol (STP), Rapid Spanning Tree Protocol (RSTP) and Multiple Spanning Tree Protocol (MSTP).

When a change in topology occurs within the network, such as the failure of a link or the addition of a bridge to the topology, a spanning tree protocol performs a process known as convergence or re-convergence. The convergence process involves computing a new spanning tree topology, electing a root bridge known to all bridges, and computing the roles and states of ports on all bridges. Spanning tree protocols typically use two primary states for bridge ports—forwarding and discarding. A port that is designated as "Alternate" is a port that is currently blocked for a given spanning tree instance. An alternate port will have a state of discarding, so that information does not pass through the port. Through this convergence process and the designation of alternate ports, a loop free topology is provided for. Once convergence is finished, the network node topology is rendered stable and the implemented spanning tree protocol is in steady state, exchanging only "Hello" messages about every 2 seconds to confirm that each link is performing properly.

Avoiding loops in a network is an important task of spanning tree protocols. When loops do occur, the communication of information via an affected bridge or bridges quickly becomes very confusing and demanding of the affected bridges' processing resources. For example, a Media Control Access (MAC) address is a unique identifier that forms the basis for most layer 2 networking. When a loop occurs, a bridge may see its own MAC address on two different ports at the same time, thus misleading the forwarding engine as to which destination port packets should be sent.

Loops in a network may also adversely impact the functionality and/or efficiency of Source Learning Protocol, a processing module that maintains a Layer 2 bridging table (i.e., the Filtering database). This Layer 2 bridging table associates any learned, given MAC address to a given port in a given VLAN. In doing so, it allows Layer 2 hardware forwarding processing to take place (i.e., sending a given frame to the correct port). In the presence of a loop, each time a station is learned on a port, if that same MAC address has been seen before on another port, the Source Learning Protocol software carries out MAC Address Movement processing whereby it updates the Layer 2 bridging table according to the most recent information available (i.e., finding an old MAC address, deleting it and creating a new MAC address).

Bridge Protocol Data Units (BPDUs) are frames that are sent by bridge protocol software to communicate with adjacent bridges. Conventional spanning tree protocols such as STP, RSTP and MSTP inhibit flooding or bridging of BPDUs by hardware. However, conventional spanning tree protocols are typically implemented in software because of the complexity of the associated algorithmic computations. The reliance on software for STP processing means that the more nodes there are in a given topology, the longer it takes to re-converge. Each time a BPDU is received, it has to be processed by the spanning tree protocol software before it can be transmitted in turn on one or several ports.

Software processing time to process and send one or several BPDUs can be as low as 10-50 milliseconds if the software is not overloaded, but the processing time can increase dramatically when software is getting congested. Thus, with conventional implementations of spanning tree protocols, it is not practical or realistic to guaranty sub-50 millisecond re-convergence times typically required in carrier space networks.

SUMMARY

Therefore, what is needed is a system and method for providing rapid convergence within a ring topology that supports multiple spanning trees while remaining compatible with the various spanning tree protocols. The system and method described herein may be referred to as Ring Rapid Multiple Spanning Tree Protocol (RRMSTP).

In one embodiment, a method is disclosed for operating a network having a group of bridges connected together to form a ring, each bridge having two ports assigned to the ring to form a group of ring ports. The claimed embodiment includes forwarding information through the ring according to one or more spanning tree instances, each instance designating one of the group of ring ports as a respective alternate port that is in a state of discarding. Responsive to learning of a failure by a bridge within the ring, a determination is made, for each spanning tree instance, whether the bridge contains a respective alternate port and if the bridge contains a respective alternate port, changing the state of the respective alternate port to forwarding.

In another embodiment, a computer-readable medium operable with a bridge processing entity for operating a network is disclosed. The claimed embodiment includes: instructions for forwarding information through a plurality of bridges that are connected to form a ring, wherein the information is routed according to a plurality of spanning tree instances, wherein each instance of the spanning tree instances designates a respective alternate port within the ring that is rendered in a state of discarding; and responsive to learning of a failure within the ring, instructions on each bridge in the ring for clearing respective forwarding tables.

In another embodiment, a network device is disclosed. The claimed device embodiment includes means for assigning a first port and a second port of the network device to a ring in which the network device is operably disposed; means for transmitting information on the first and second ports according to a spanning tree instance supported on the ring, wherein the first port and the second port each have a state of either forwarding or discarding associated with the spanning tree instance; means, responsive to learning that a failure has occurred in the ring, for determining whether the state of either the first port or the second port is discarding; and means, operable responsive to the state of either the first port or the second port being discarding, for changing the port state from discarding to forwarding.

In yet another embodiment, a network system with a plurality of bridges connected together to form a ring is disclosed. Each bridge of the plurality of bridges is provided with first and second ports assigned to the ring to form a plurality of ring ports. The claimed network system embodiment comprises; means for forwarding information through the ring according to a spanning tree instance supported on the ring, the spanning tree instance designating one of the plurality of ring ports as a respective alternate port associated with a bridge that is rendered in a state of discarding; and means, operable responsive to learning of a failure within the ring, associated with each bridge in the ring for determining whether the bridge contains a respective alternate port and if the bridge contains a respective alternate port, for changing the state of the respective alternate port to forwarding.

BRIEF DESCRIPTION OF THE DRAWINGS

A more complete understanding of the present patent disclosure may be had by reference to the following Detailed Description when taken in conjunction with the accompanying drawings wherein.

DETAILED DESCRIPTION OF THE DRAWINGS

Figure 1:
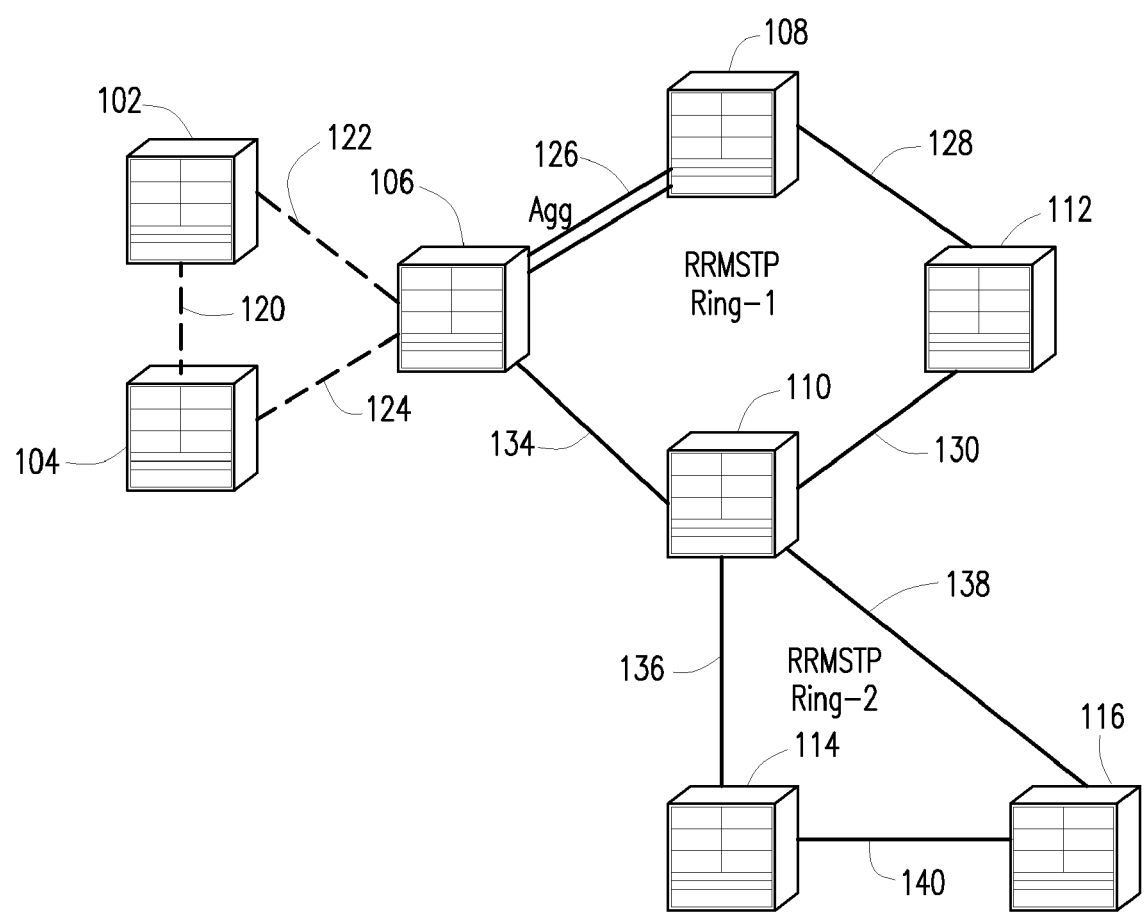
FIG. 1 shows an allowable topology for a network using RRMSTP in accordance with one embodiment.

Embodiments of the present disclosure will now be described hereinbelow with reference to various examples. Like reference numerals are used throughout the description and several views of the drawings to indicate like or corresponding parts, wherein the various elements are not necessarily drawn to scale.

A bridge that is part of an RRMSTP ring as disclosed herein may support conventional MSTP as well as specific capabilities disclosed herein. This allows the bridges in the ring to operate within a larger network that supports spanning tree protocols. In one embodiment, MSTP computes the port roles and port states within the ring such that an alternate port is designated for each spanning tree instance supported by the RRMSTP ring. The procedures specific to RRMSTP are used when a failure occurs within the ring; these procedures provide a quicker re-convergence but do not generally interfere with procedures of MSTP unless specifically noted.

Once the RRMSTP module/engine/stack is installed on a given bridge, the administrator uses a command to designate two ports on the bridge as RRMSTP ports associated with a given RRMSTP ring. These two ports are considered to be peers of each other, since they exist on the same bridge and are assigned to the same ring. Each RRMSTP ring is referred to by a distinct ring number, e.g., "Ring One". The two ports associated with Ring One are used only within that ring. Other ports on the bridge can be associated with additional RRMSTP rings, although membership of the bridge in other RRMSTP rings cannot violate certain rules that will be explained below. Ports on the bridge that are not designated as part of an RRMSTP ring can communicate with bridges using other STP formats, but since they are not ring members, these other ports will ignore any RRMSTP commands. The number of rings configured on a bridge may be limited to a predetermined number that is associated with the particular type of bridge.

When a ring is configured, RRMSTP computes two MAC addresses, which are distinct, proprietary destination addresses associated with the ring number. These two MAC addresses are associated with the transmission of packets in opposite directions around the ring and can be designated, e.g., "MAC One" and "MAC Two". As bridges are added to Ring One, each bridge must have a "Port One" that is assigned to MAC One and a "Port Two" that is assigned to MAC Two, so that each bridge's Port One defines a particular direction of flow around the ring, such as clockwise direction. Likewise, each bridge's Port Two defines the opposite direction of flow, e.g., counterclockwise direction.

Also during configuration, the hardware forwarding table associated with the bridge is updated so that an RRMSTP frame using the MAC One address is hardware-forwarded towards Port One of the bridge and an RRMSTP frame using the MAC Two address is hardware-forwarded towards Port Two of the bridge. Additionally, the hardware is configured such that when a packet carrying either the MAC One or MAC Two addresses is received, the packet is also sent to the bridge's processor functionality for RRMSTP-specific software processing. In an exemplary embodiment, the configuration software computes the same pair of MAC addresses in relation to a given ring number, ensuring that when RRMSTP is configured on another bridge, the same ring number will lead to the same MAC addresses computation and hardware forwarding table updates. To state this in another way, the use of Ring One with Port One and Port Two leads to the computation of the same pair of MAC addresses on all bridges supporting RRMSTP. Additionally, this scheme allows hardware forwarding table entries to be programmed so that a frame is output on Port One when carrying MAC One and is output on Port Two when carrying MAC Two.

When designing the topology of a ring, care must be taken to ensure that there are no physical links that might at some point create a data loop around a link that is part of an RRMSTP ring. RRMSTP may bypass some of the standard procedures in MSTP in order to cause the desired bound convergence time within the ring. Since the bypassed procedures may also operate to ensure that no loop is formed within the topology, the topology itself must guard against possible loops in bypassing the protocol.

FIG. 1 discloses an exemplary embodiment of an allowable topology for RRMSTP. In this embodiment, eight bridges and their physical connections are shown. Bridges 102, 104 support a spanning tree protocol according to one of the IEEE protocols, but do not support RRMSTP and cannot participate in an RRMSTP ring. Bridges 106, 108, 110, 112, 114, 116 are all MSTP bridges that also support RRMSTP. In this Figure, the links that form part of an RRMSTP ring are shown as solid lines, while those links that are not part of a ring are shown as dotted lines. As illustrated here, links 120, 122, 124 are governed by an appropriate spanning tree protocol, such as STP, RSTP, or MSTP, while links 126, 128, 130, 134 form RRMSTP Ring-1 and links 136, 138, 140 form RRMSTP Ring-2. As required by the restriction noted earlier, none of links 126, 128, 130, 134, 136, 138, 140, each of which participates in an RRMSTP ring, is part of any other data loop. Ring-1 and Ring-2 use different ports of bridge 110, but no links are common between the two rings.

Figure 2:
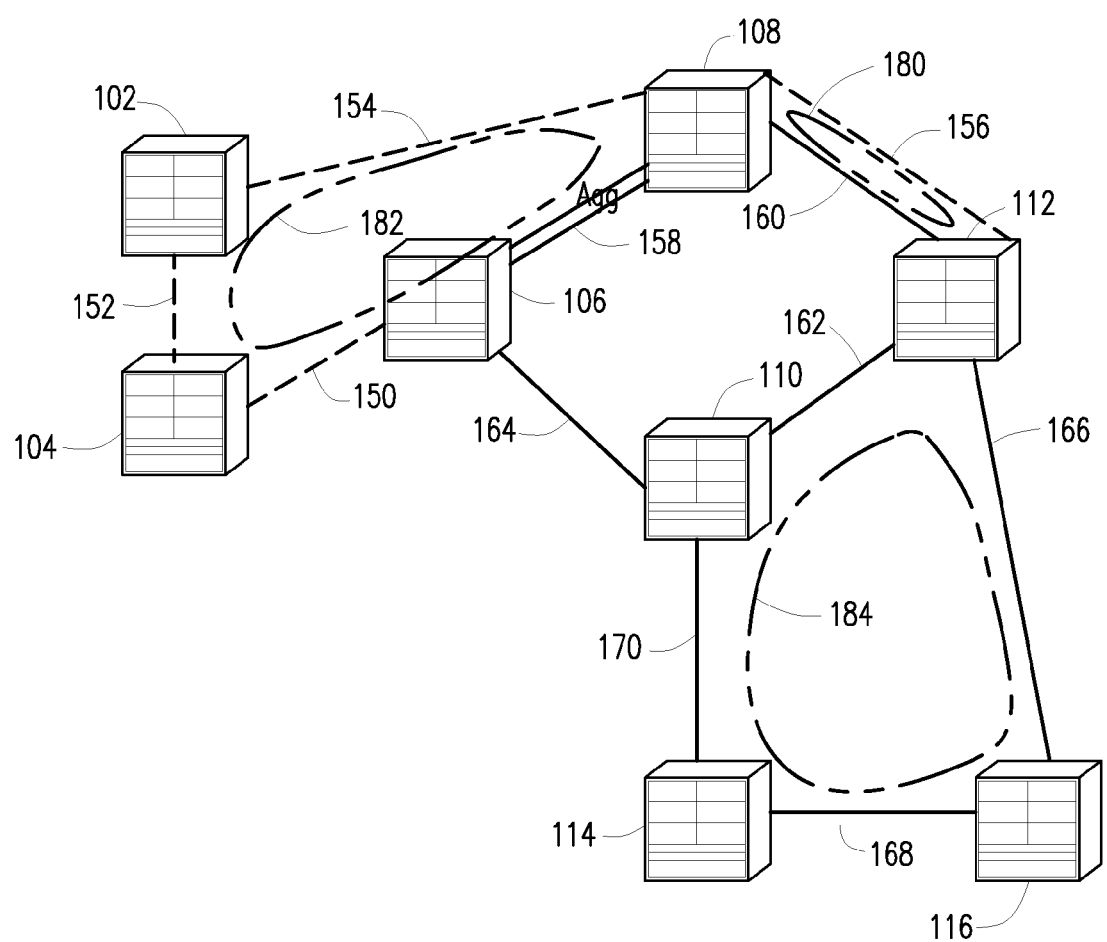
FIG. 2 shows a network that violates the topology that is necessary when using RRMSTP in accordance with one embodiment.

Turning now to FIG. 2, the same eight bridges of FIG. 1 are connected in an exemplary topology that violates the rule regarding links within the ring. As was shown in FIG. 1, the links that are constituted as RRMSTP links are shown as solid lines, while other links are dotted lines. Assuming that bridges 106, 108, 110, 112 were originally connected to form an RRMSTP ring through links 158, 160, 162, 164, three additional loops 180, 182, 184 have been formed that make the topology invalid. Links 156 and 160 form loop 180 between bridges 108 and 112. Link 160 was previously configured as part of an RRMSTP ring, so loop 180 cannot be allowed in the topology. Similarly, links 150, 152, 154, 158 create loop 182 involving bridges 102, 104, 106, 108. Link 158 is part of an RRMSTP ring, so including this link in another physical loop cannot be allowed. Finally, links 162, 166, 168, 170 form loop 184 involving bridges 110, 112, 114, 116. Link 162 is already part of an RRMSTP ring, so inclusion of this link in an additional physical loop is not allowed.

Figure 3A:
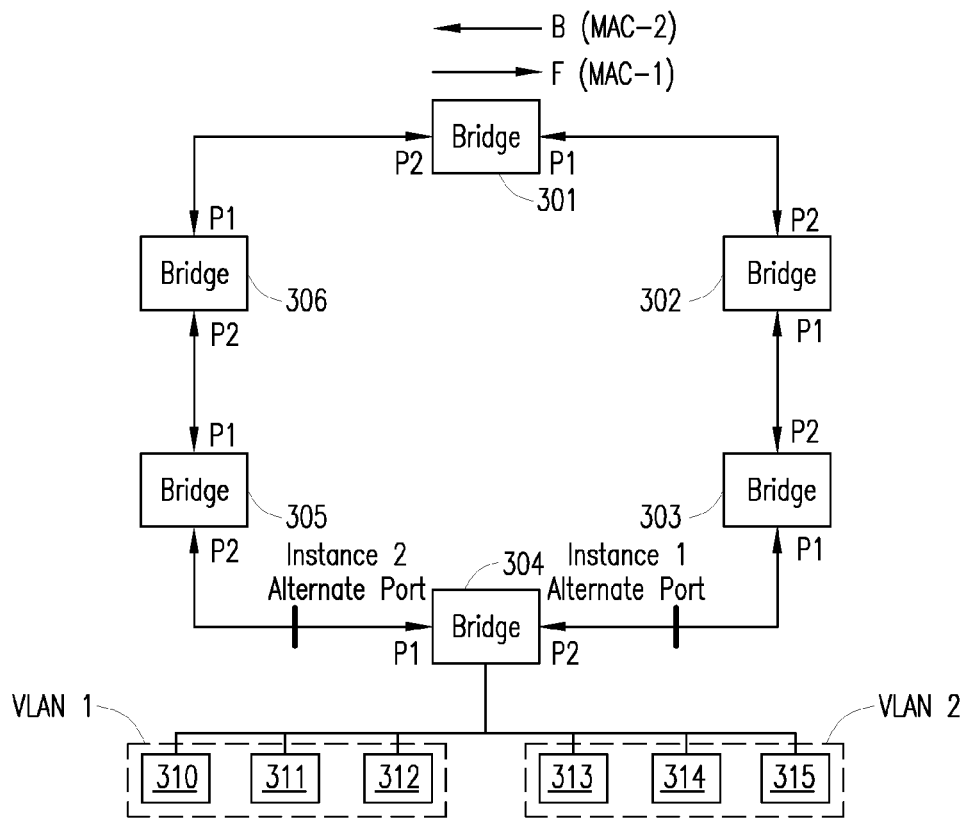
FIG. 3A shows a ring that is configured to use RRMSTP in accordance with one embodiment.

FIG. 3A depicts an exemplary embodiment of an RRMSTP ring containing six bridges 301-306. MAC-1 is designated as the address for the forward or clockwise direction in the ring and MAC-2 is designated as the address for the backward or counterclockwise direction in the ring. Accordingly, each of bridges 301-306 has a first port P1 and a second port P2, wherein the clockwise and counterclockwise directions may be referred to as first and second directions, respectively or otherwise. Thus, traffic carrying a MAC-1 address will be automatically forwarded to P1 on each bridge in one direction, while traffic carrying a MAC-2 address will be automatically forwarded to P2 on each bridge in the opposite direction.

Attached to the ring through bridge 304 are a number of nodes 310-315 configured as two virtual local area networks (VLANs). Nodes 310, 311, 312 are configured as VLAN-1 and nodes 313, 314, 315 are configured as VLAN-2. In this embodiment, two spanning tree instances are illustrated and MSTP has configured the ring to prevent data loops in each instance. It will be understood that while only two spanning tree instances are shown for clarity, there may be as many instances as can be supported.

In the embodiment shown, port P2 of bridge 304 has been designated as the alternate port for spanning tree instance 1, so this port has a state of discarding for instance 1 traffic. If VLAN-1 is assigned to spanning tree instance 1, ring traffic from nodes 310, 311, 312 is sent to port P1. Similarly, port P1 of bridge 304 has been designated as the alternate port for spanning tree instance 2, so this port is in discarding state for instance 2 traffic. If VLAN-2 is assigned to spanning tree instance 2, ring traffic from nodes 313, 314, 315 will be sent to port P2. It will be understood that the specific embodiment is shown for illustration only and that multiple instances of spanning trees can be mapped on this ring, with each instance having an alternate port associated with that instance. Alternate ports for various instances can be on different bridges from each other and multiple VLANS can be mapped to each instance.

Figure 3B:
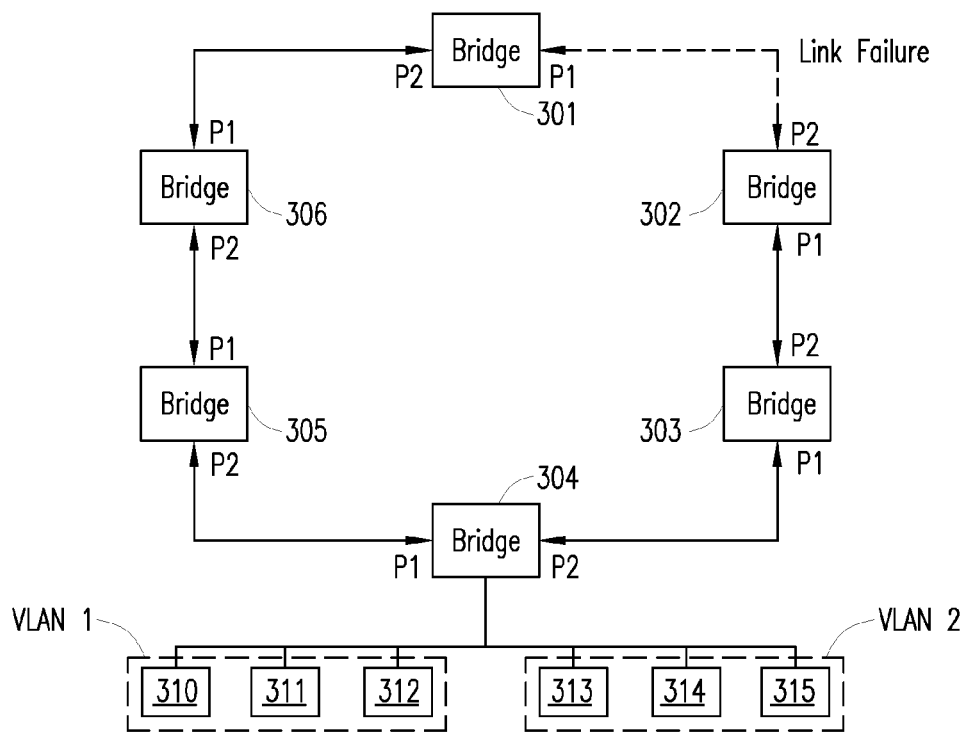
FIG. 3B shows the ring of FIG. 3A as it is configured after a link failure in accordance with one embodiment.

In FIG. 3B, the ring of FIG. 3A is shown after the link between bridge 301 and bridge 302 has failed, as illustrated by the dotted line. In order to assure that all traffic can be properly routed, the state of the alternate port for each of the spanning tree instances is changed from discarding to forwarding. Although the necessary change in port states for the spanning tree instances can be performed by either MSTP or RRMSTP, the time required for each protocol to accomplish this action can be significantly different. Accordingly, in one exemplary embodiment, this action may preferably be performed by RRMSTP.

According to the MSTP standard, a bridge charged with activating a port that is presently blocked, i.e., discarding, would initiate hop-by-hop handshakes from the activated port. These handshakes, carrying some cuts, would normally proceed from the activated port to any bridges of the tree's branch until all the leaves of the tree's branch are reached. This sequence of handshakes, which ensures that no loops are present in the spanning tree, is generally the cause of the longer convergence time in MSTP and prevents the ability to ensure a bound delay time. Therefore, this processing may be bypassed in favor of the procedures implemented by the disclosed protocol herein.

Figure 4A:
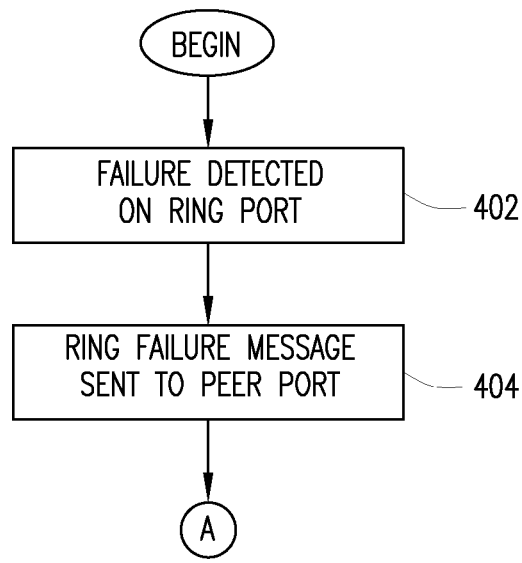
FIG. 4A shows the initial steps taken by a bridge that detects a failure within the ring in accordance with one embodiment.

The use of RRMSTP to achieve re-convergence within the ring shown in FIG. 3B will be discussed with reference to FIGS. 4A-C. A bridge can learn of a failure in the ring in two ways: the bridge can detect the failure on one of the ports belonging to the bridge or the bridge can receive a ring failure message from a bridge that detected the failure. Referring first to FIG. 4A, the actions specific to a bridge that detects a failure on the ring are discussed according to one embodiment. As shown, the flow begins with a failure being detected on a port that is part of an RRMSTP ring (block 402). In the exemplary embodiment of a ring shown in FIG. 3B, the link between bridges 301 and 302 has failed. This failure would be detected on bridge 301 and also on bridge 302. As soon as the RRMSTP functionality (e.g., module, engine or stack) determines that the failure has occurred, each of bridges 301, 302 sends out a ring failure message on the peer port of the bridge where the failure was discovered (block 404). The failure message sent by the RRMSTP functionality will be referred to here as a "Ring Failure" message, to distinguish this message from other BPDUs that identify failures elsewhere in the network. Specifically, bridge 301 detects the failure on port P1 and sends the ring failure message on port P2, while bridge 302 detects the failure on port P2 and sends the ring failure message on port P1. The ring failure message carries either the MAC-1 or MAC-2 address, depending on the direction the message will travel, as well as notification of the failure. Further processing of the failure on bridges 301, 302 is handled in the same manner as on the other bridges and will be discussed in reference to FIG. 4C.

Figure 4B:
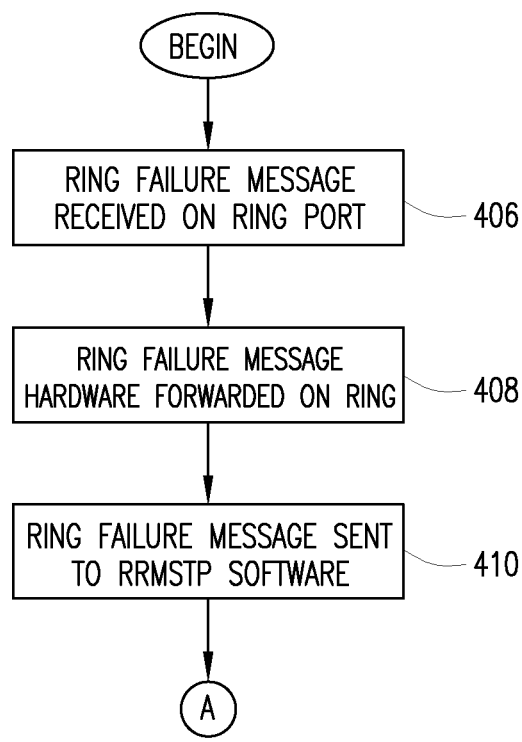
FIG. 4B shows the initial steps taken by a bridge that receives a ring failure message on a ring port in accordance with one embodiment.

Referring next to FIG. 4B, initial processing on the remaining bridges of the ring, such as bridges 303-306, is discussed. For these bridges, RRMSTP processing begins with the receipt of the ring failure messages sent by either of bridges 301, 302 (block 406). Although not specifically shown, only the first of these two ring failure messages will be processed on a bridge; the second message received for the same failure will be ignored to prevent unnecessary processing. Because of the initial configuration of the bridge, the bridge hardware may automatically forward the ring failure message around the ring (block 408). Additionally, the initial configuration also causes the ring failure message to be sent to the RRMSTP functionality for processing (block 410).

Figure 4C:
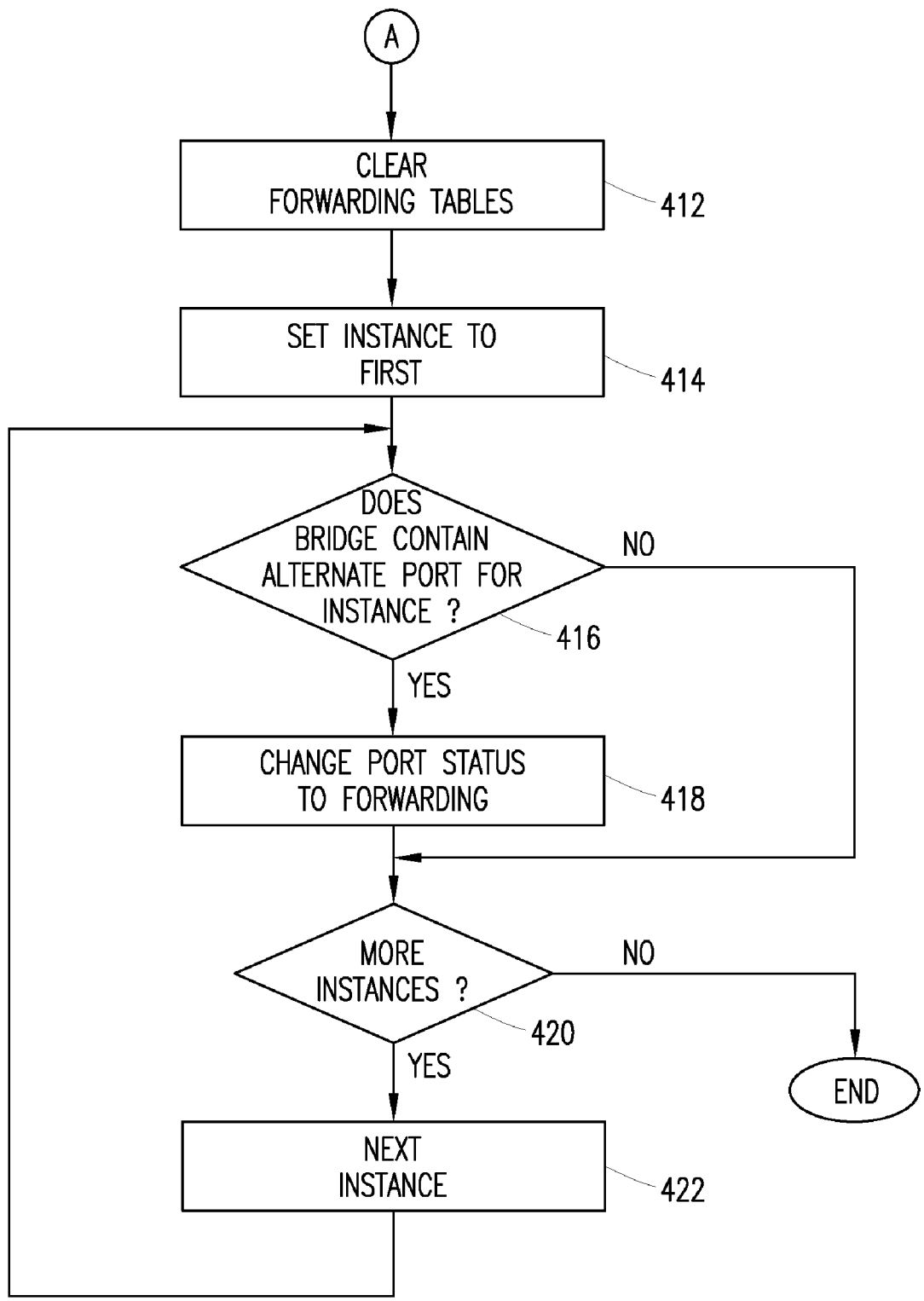
FIG. 4C shows further steps taken by all bridges in the ring after a failure in accordance with one embodiment.

With reference now to FIG. 4C, further processing performed by all of the bridges in the ring is discussed. Once a failure has occurred, the forwarding tables, used by hardware on each bridge to forward traffic, may become invalid and must be cleared. The tables are then recreated through a learning process. MSTP waits until the re-convergence is complete to clear the forwarding tables. However, under RRMSTP, the forwarding tables are cleared as soon as the failure is known (block 412) to allow the re-learning to be started at least substantially immediately. This processing may be termed "flush-in-advance" for purposes of the present patent application. When an error occurs on the ring in FIG. 3B, each of bridges 301-306 clears the forwarding tables for every port except for ring ports P1 and P2.

Another task for the RRMSTP functionality is to ensure that traffic can reach each of the available bridges in the ring. Because of the ring structure, RRMSTP can avoid the lengthy hop-to-hop protocol of MSTP, knowing that the state of any alternate port on the ring should be changed from discarding to forwarding. RRMSTP, operating on each of the bridges, initializes the spanning tree instances to be examined (block 414). For example, the functionality sets the spanning tree instance to be examined to the first instance and determines whether the bridge contains the alternate port for that instance (block 416). However, in some implementations, there may be only one spanning tree instance supported on the ring. Regardless, if the bridge contains the alternate port, the port state is changed to forwarding (block 418); otherwise, block 418 is skipped. The functionality then determines whether any more spanning tree instances remain to be examined, if applicable (block 420). If additional instances remain, the next instance is examined (block 422) and processing continues with block 416 in an iterative manner until all instances have been examined.

In one exemplary embodiment, RRMSTP uses several variables and procedures in the state machines implemented by a multiple spanning tree protocol in order to effectuate the processing set forth above. These variables and procedures are discussed with respect to FIGS. 5-8. It is noted that the state machines are complex and their logic can be difficult to follow. Therefore, only those variables and procedures directly related to RRMSTP are shown.

Figure 5:
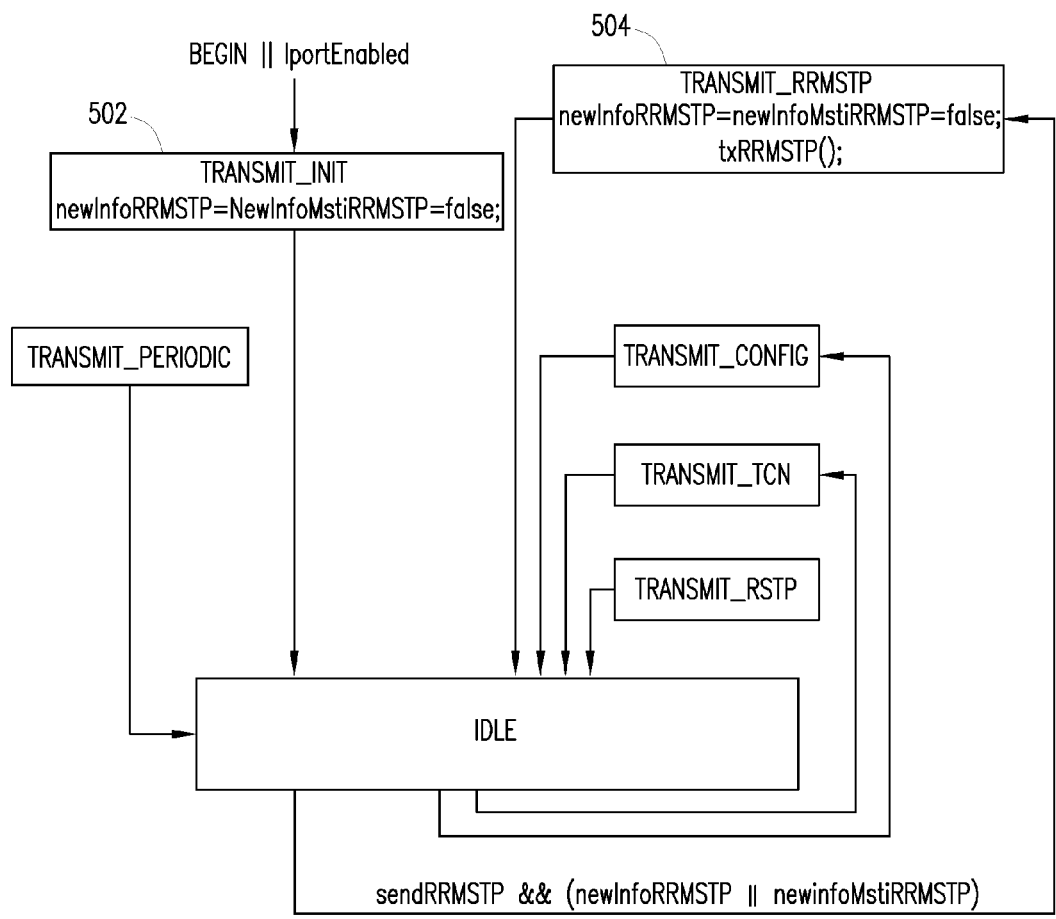
FIG. 5 is a block diagram of a port transmit state machine used in RRMSTP in accordance with one embodiment.

Referring first to FIG. 5, a port transmit state machine is shown according to one embodiment. This state machine is responsible for transmitting Bridge Protocol Data Units (BPDUs). Two variables and one procedure are directly related to the RRMSTP protocol. NewInfoRRMSTP is a Boolean variable that is set to true if an RRMSTP BPDU conveying a failure notification for the Common Internal Spanning Tree (CIST) is to be sent out. The variable is then set to false by the port transmit state machine once the RRMSTP BPDU is transmitted. NewInfoMstiRRMSTP is a Boolean variable that is set to true if an RRMSTP BPDU conveying a failure notification for a Multiple Spanning Tree Instance (MSTI) is to be sent out. This variable is set to false by the port transmit state machine once the RRMSTP BPDU(s) is transmitted. As seen in FIG. 5, both of these variables are set to false when the port transmit state machine is initialized (block 502). Additionally, TxRRMSTP( ) is a procedure (block 504) that actually encodes an RRMSTP BPDU, referred to earlier as the ring failure message. In one implementation, the MAC destination address for the RRMSTP BPDU must be different from the Bridge Control Protocol addresses starting with 01:80:c2:xx:xx:xx. The MAC addressing is typically set in accordance with a system-dependent implementation and may also depend on the user configuration. The exact frame format for this BPDU is not particularly critical and is not specified here.

At the time a failure happens on an RRMSTP port, it is preferable, although not necessary, that the RRMSTP implementation sends an RRMSTP frame prior to any MSTP frame triggered by the same topology change. Normally MSTP frames are sent out when all the state machines have finished completing, insuring that only one frame is sent per processing.

After a failure, it may be desirable to add a waiting period (e.g., one second) to the next Hello message associated with the RRMSTP ring that has the failure. This is to avoid having a Hello frame erasing temporary RRMSTP port's vector information if the hello frame is received prior to the standard MSTP frame related to the failure. One convenient way to do it is to modify the state DISABLE_PORT of a disable port role transitions state machine since a previously forwarding port facing a failure will enter this state.

Figure 6:
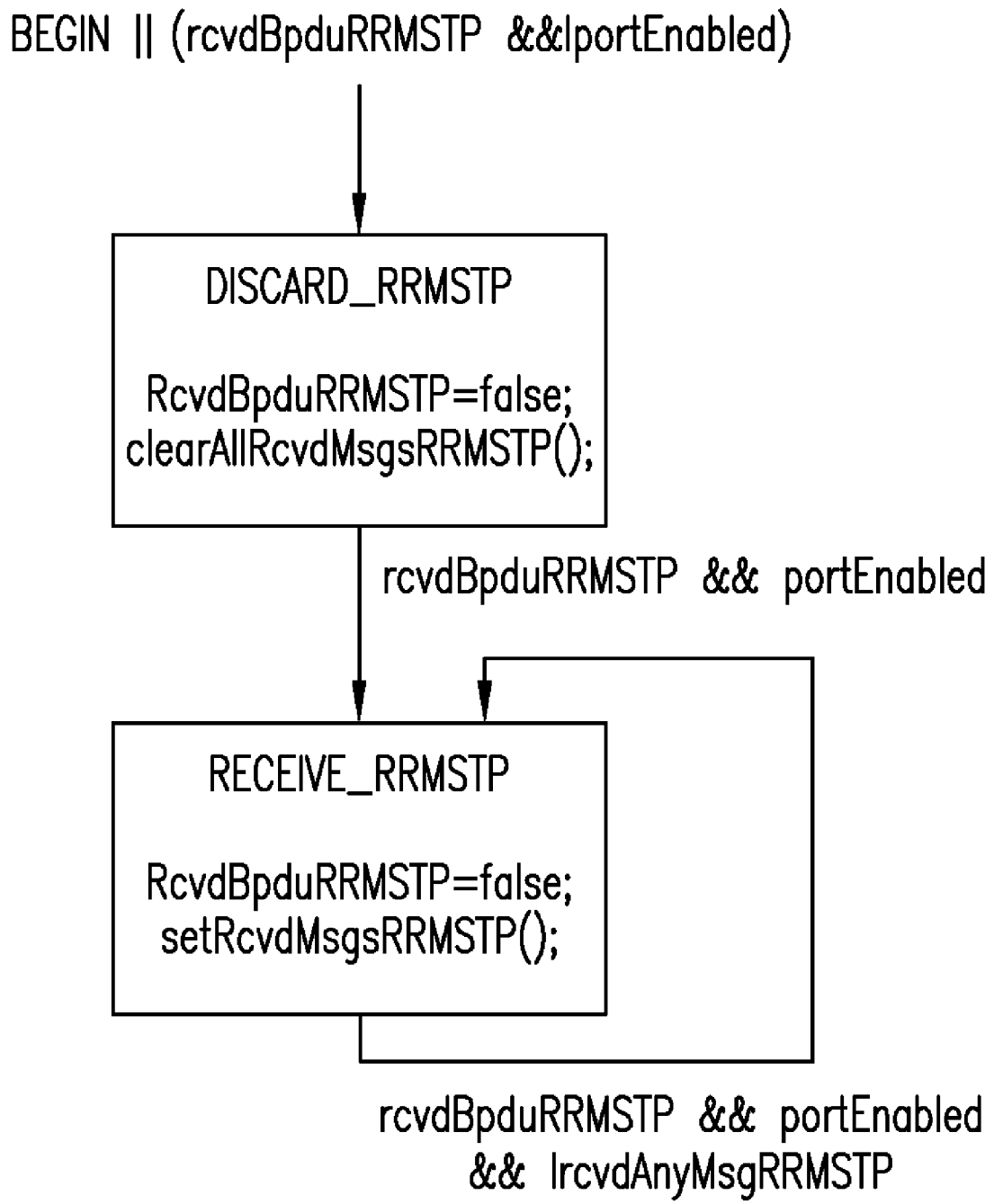
FIG. 6 is a block diagram of a port receive state machine used by RRMSTP in accordance with one embodiment.

Referring next to FIG. 6, an RRMSTP port receive state machine, which is responsible for receiving BPDUs, is shown according to one embodiment. Three variables and two procedures related to RRMSTP are shown. RcvdBpduRRMSTP is a single, per port Boolean variable used by all instances. This variable is set by system dependent processes and notifies the RRMSTP port receive state machine when a valid RRMSTP BPDU is received on the port. This variable is reset by the port receive state machine once an incoming frame is processed. RcvdAnyMsgRRMSTP is a variable that is set to true for a given port if rcvdMsgRRMSTP is true for the CIST or any MSTI for a given port. RcvdMsgRRMSTP is a per port per instance Boolean variable that communicates the arrival of a valid RRMSTP frame to the port information state machine.

Figure 8:
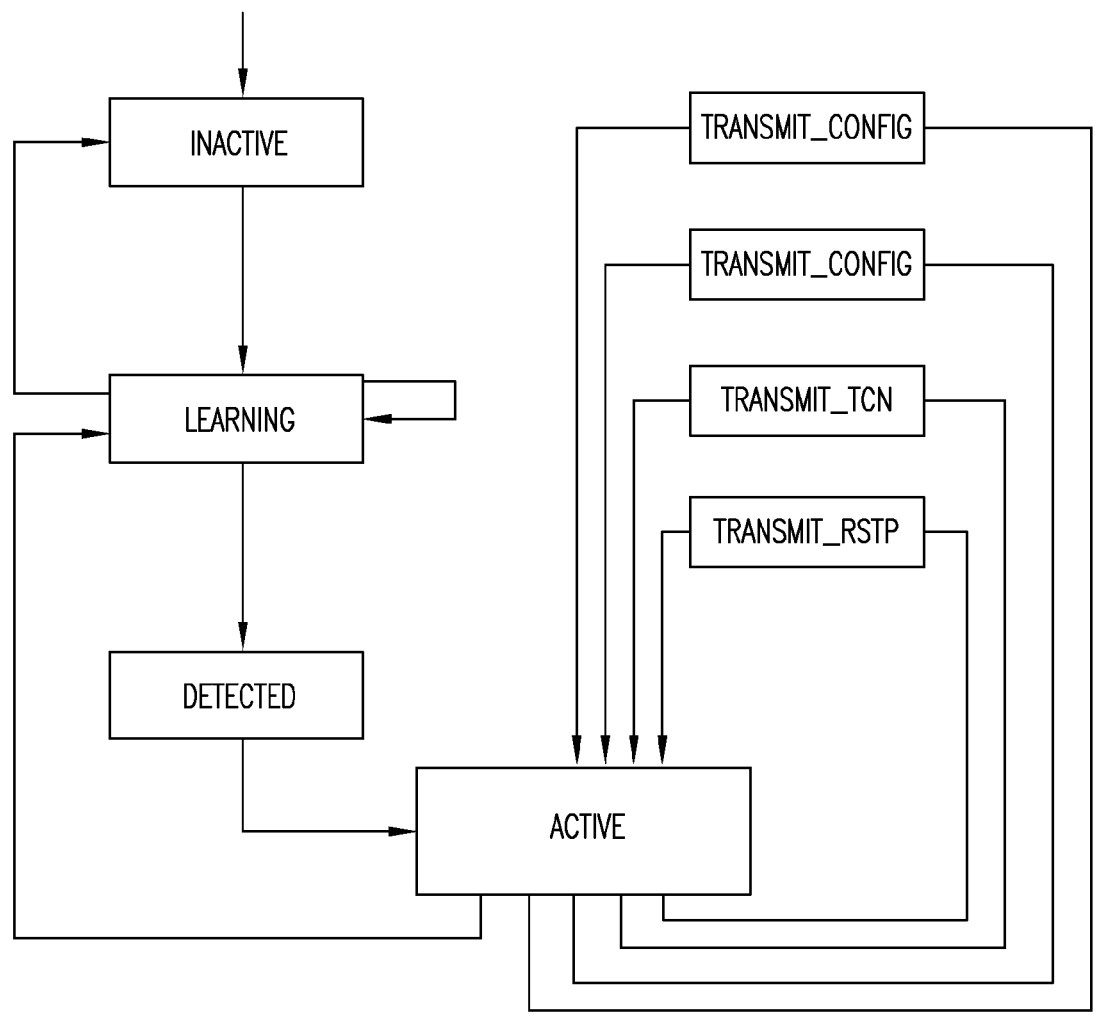
FIG. 8 is a block diagram of the topology change state machine used by RRMSTP in accordance with one embodiment.

SetRcvdMsgsRRMSTP( ) is a procedure that sets rcvdMsgRRMSTP for the CIST and for each and every MSTI on a given port, if for a given instance, the given port or the peer port is an alternate port. In that case portRRMSTP (defined below with reference to FIG. 8 is also set on both ports for the given instance. The variable rcvdMsgRRMSTP makes the received message available to the port information state machines. Finally, ClearAllRcvdMsgsRRMSTP( ) is a procedure that clears rcvdMsgRRMSTP for the CIST and all MSTIs, on a per port basis.

As part of receiving RRMSTP messages, the state machine of FIG. 6 is operable to assess whether the RRMSTP message is valid. If the frame is received on a bridge that does not support RRMSTP, the message may simply be discarded by the software. If the bridge supports RRMSTP but the port was not previously declared an RRMSTP port, then the RRMSTP functionality claims the RRMSTP frame but may discard the frame. If the port receiving the frame is an RRMSTP port, then an RRMSTP procedure may execute some RRMSTP processing according to the proposed specifications. Checking if the frame is valid further means checking whether the MAC destination address received on an RRMSTP port has been previously configured on this port. This requirement takes care of user mis-configuration, allowing only the processing of RRMSTP frames received on the right RRMSTP port. For example, and in using the terminology already used to illustrate some previous examples, if a RRMSTP frame using "MAC One" as Destination MAC is received on Port Two (of Ring One), it is further processed. If this same RRMSTP frame is received on any other RRMSTP port than Port Two, like Port One (of Ring One) or Port Three (of another ring, "Ring Two") for example, it may be dropped. Remember that this frame is also being forwarded by hardware on Port One, according to configuration's example given earlier and that we can also count on the fact that hardware makes sure by design to never send a frame received on port x to that same port x according to L2 standards. If the frame is valid, then rcvdBpduRRMSTP becomes true, and the RRMSTP "Port Receive state machine" may be triggered.

Figure 7:
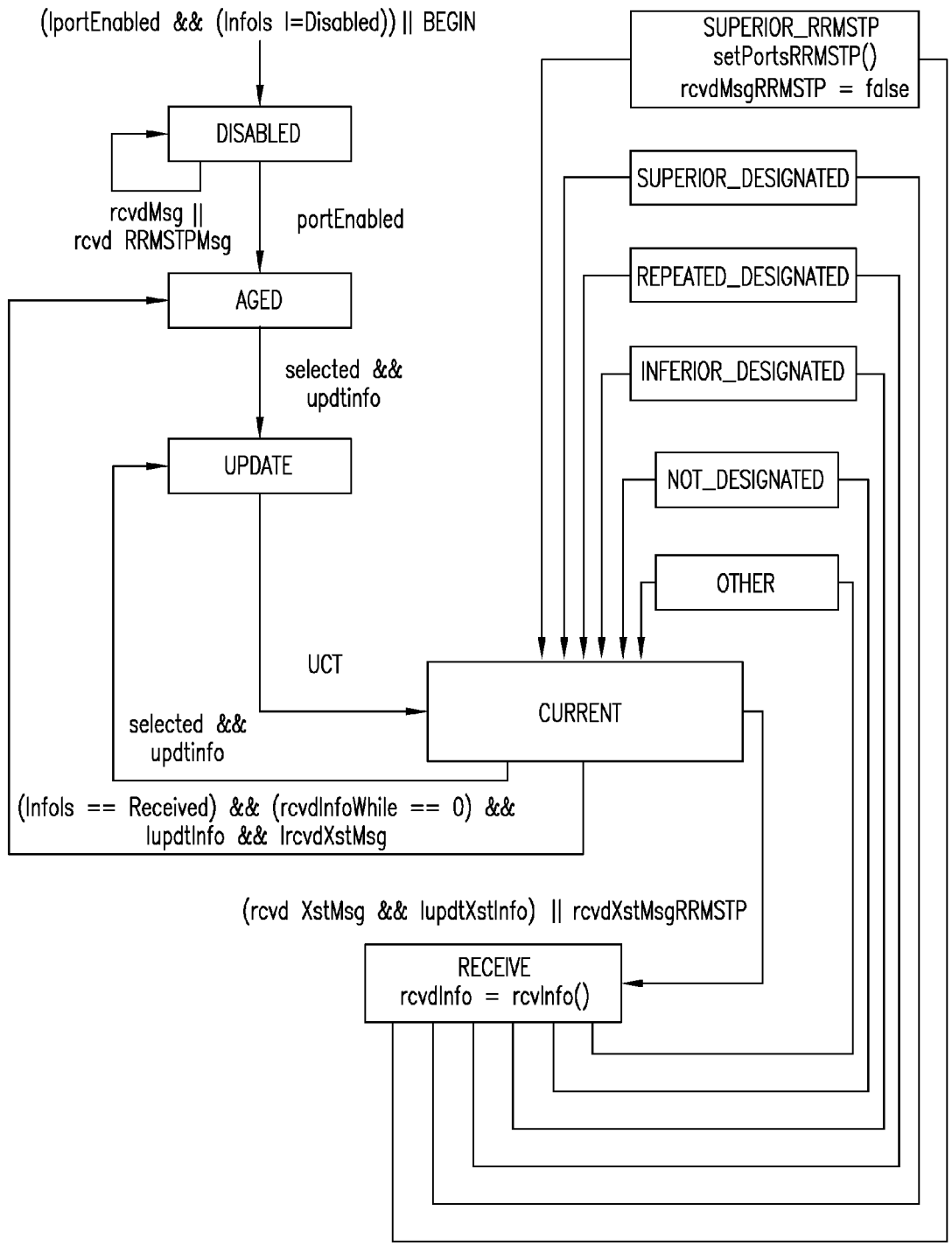
FIG. 7 is a block diagram of a port information state machine used by RRMSTP in accordance with one embodiment.

FIG. 7 depicts an exemplary port information state machine according to one embodiment. This state machine is responsible for recording the spanning tree information currently in use by CIST or a given MSTI for a given port, aging that information out if it was derived from an incoming BPDU, and recording the origin of information. PortRRMSTP is a per port, per instance Boolean variable that communicates to different state machines associated with the two ports belonging to an RRMSTP ring of the processing of a respective RRMSTP frame. The variable is reset systematically by the system dependant process whenever a BPDU or an RRMSTP frame is received, and before any further processing.

The procedure Rcvinfo( ) tests whether rcvdMsgRRMSTP is true for a given port and tree. If rcvdMsgRRMSTP is true, the procedure returns SUPERIOR_RRMSTP. SetPortsRRMSTP( ) is another RRMSTP procedure. If the receiving port is an alternate port, this procedure sets the role of the receiving port to root and arbitrarily sets the role of the peer port for the current instance to a designated state. Otherwise, the receiving port's role is root or master and the peer port's role is alternate, so the role of the receiving port is arbitrarily set to designated, and the role of the peer port is arbitrarily set to root. Note that the combination of master and alternate designation for a given MSTI and on the same RRMSTP ring is possible. In addition, this function sets the Root ID at the worst possible value for each calling instance on both the receiving port and the peer port. If the current instance is the CIST, it sets the CIST port priority vector's "CIST Root ID" to the worse possible value. If the current instance is an MSTI, it sets the MSTI port priority vector's "MSTI Regional Root ID" to the worst possible value.

With reference now to FIG. 8, a topology change state machine is shown according to one embodiment. In this state machine, a Topology Change BPDU may not be sent by MSTP if a port was set to forwarding when an RRMSTP failure message was received, as the necessary flushes of forwarding tables have already been performed in response to the RRMSTP failure message. This can be enforced by testing whether or not the variable portRRMSTP is false on the current port. If portRRMSTP is true, the block of sending a topology change BPDU is skipped; otherwise, the topology change BPDU is sent.

The RRMSTP procedures may typically run within the context of MSTP, so that an occurrence such as a failure within the ring can trigger a response from both the RRMSTP functionality and from the MSTP functionality. When a failure in the ring triggers both types of responses (i.e., MSTP and RRMSTP), failure messages from both of these procedures can be sent. However, RRMSTP failure messages are hardware-forwarded throughout the ring quickly, while MSTP messages proceed point-to-point around the ring, requiring software processing at each bridge before the error message is propagated. This condition means that the RRMSTP failure message will be seen first by virtually every bridge in the ring. Once the RRMSTP message is seen on a bridge, the state of alternate ports has already been set to forwarding and the forwarding tables of these bridges have been cleared and have begun relearning the topography, so that recovery is quickly realized. MSTP messages may then follow along later to ensure that all changes have occurred properly. In one exemplary implementation, the only need may be to prevent MSTP from clearing the forwarding tables again unnecessarily.

The block diagrams that are shown in FIGS. 5-8 represent specific state machines for a complex set of procedures forming the multiple spanning tree protocol. One alternative to modifying the state machines of a multiple spanning tree protocol is to use hardware that bypasses the state machines and directly manipulates the state of the alternate ports whenever a failure occurs within the ring. In this embodiment, RRMSTP functionality detects the failure and sends an RRMSTP failure message as discussed above. Then, whenever an RRMSTP frame is received, the bridge hardware can check whether either the receiving port or the peer port is an alternate port for any instance. If either port is in alternate state, that port is set to forwarding by the hardware without allowing the MSTP functionality become aware of the change. Regardless of the particular embodiments, it will be realized that service logic operable to effectuate the foregoing operations and determinations may be accomplished via a number of means, including software (e.g., program code), firmware, hardware, or in any combination, usually in association with a processing system associated with the stack elements. Where the processes are embodied in software, such software may comprise program instructions that form a computer program product, instructions on a computer-readable medium, uploadable service application software, or software downloadable from a remote station, and the like.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method of operating a network comprising a plurality of bridges connected together to form a ring, each bridge of the plurality of bridges having first and second ports assigned to the ring to form a plurality of ring ports, the method comprising:
   designating one of the plurality of ring ports in the connected bridges as an alternate port in a discarding state for each instance of a plurality of spanning tree instances;
   forwarding information through the ring according to the plurality of spanning tree instances; and
   responsive to a failure within the ring, clearing respective forwarding tables for each bridge in the ring except a table associated with a bridge port that detects the failure and a bridge port that forwards a failure message, and changing the state of each ring port designated as an alternative port in a discarding state for each of the spanning tree instances from the discarding state to a forwarding state.

2. The method of claim 1 further comprising configuring each of the plurality of bridges such that a ring failure message that conveys information about the failure in the ring is forwarded around the ring.

3. The method of claim 2 further comprising configuring each of the plurality of bridges such that the ring failure message is sent to a respective processor on each of the plurality of bridges.

4. The method of claim 3 wherein a first bridge sends the ring failure message in a first direction around the ring and a second bridge sends the ring failure message in a second direction around the ring.

5. A memory comprising encoded instructions stored thereon for:
- designating one of a plurality of ring ports, in a plurality of bridges that are connected to form a ring, as an alternate port in a discarding state for each instance of a plurality of spanning tree instances;
- forwarding information through the plurality of bridges that are connected to form the ring according to the plurality of spanning tree instances; and
- responsive to a failure within the ring, changing the state of each alternative port within the ring of connected bridges designated as being in a discarding state for each of the spanning tree instances from the discarding state to a forwarding state and clearing respective forwarding tables for each bridge except a table associated with a bridge port that detects the failure and a bridge port that forwards a failure message.

6. The memory of claim 5 further comprising instructions, responsive to the failure within the ring, for sending a ring failure message that is configured for forwarding around the ring and that is also captured and sent to a respective processor associated with each bridge in the ring.

7. The memory of claim 5 further comprising instructions, responsive to the failure within the ring, for sending the ring failure message to a bridge processing entity for further processing.

* * * * *